Oct. 27, 1936.     T. M. STEPHENS     2,058,737
CUTTING TOOL
Filed Jan. 6, 1936
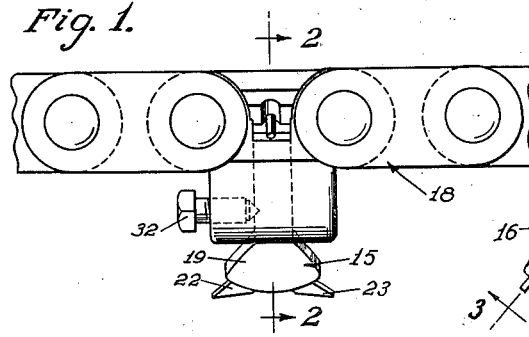
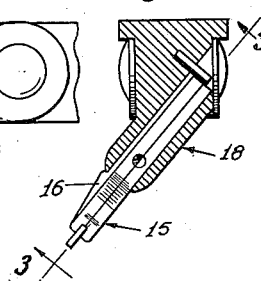
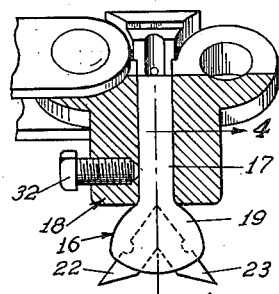
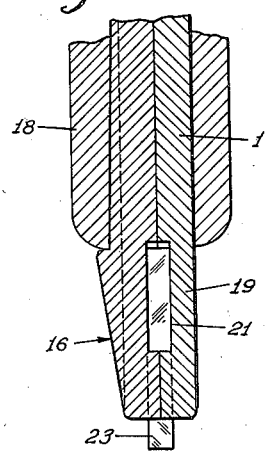
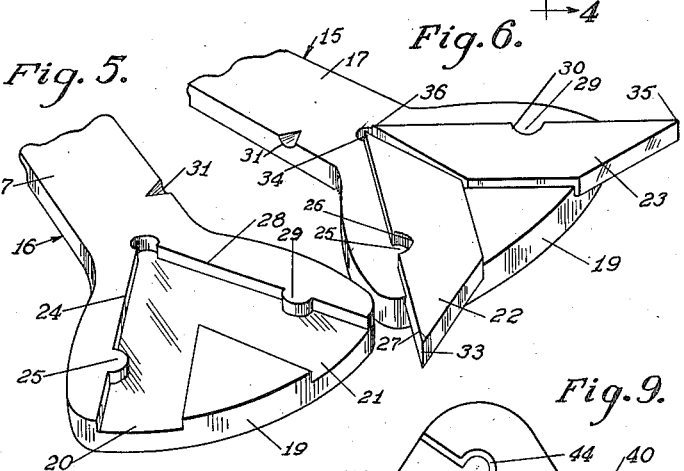
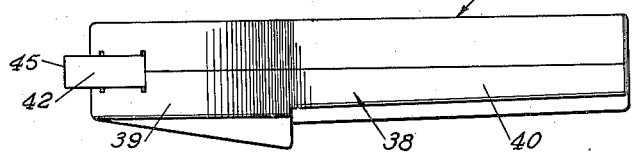
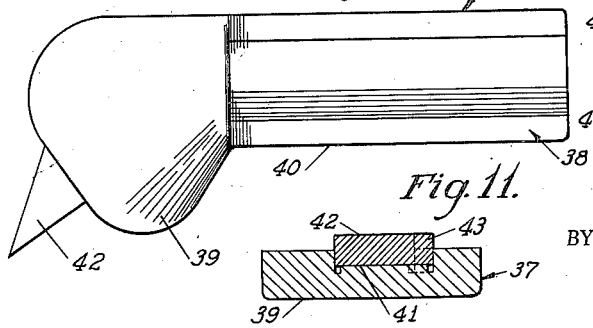
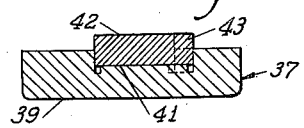
INVENTOR.
Thomas M. Stephens
BY Threedy and Cannon
HIS ATTORNEYS.

Patented Oct. 27, 1936

2,058,737

UNITED STATES PATENT OFFICE 2,058,737

CUTTING TOOL

Thomas M. Stephens, Michigan City, Ind.

Application January 6, 1936, Serial No. 57,760

3 Claims. (Cl. 262—33)

This invention relates to cutting tools.

It is an object of this invention to provide an improved cutting tool which is relatively simple and inexpensive in construction and efficient in use.

Another object of the present invention is to provide a new and improved cutting tool which is especially adapted for use in conjunction with a coal mining machine.

An additional object of the present invention is to provide a new and improved cutting tool especially adapted for use, in conjunction with a coal mining machine, in places where the belt or carrier of the machine upon which the cutting tool is mounted cannot be moved continuously in one direction but must be reciprocated back and forth by reason of the formation or other conditions present at the work.

A further object of the present invention is to provide an improved cutter for a mining machine embodying a chuck or holder and oppositely extending bits arranged upon said chuck so that the cutter and its support may be moved or reciprocated in opposite directions and at the same time be effective to perform the cutting operation during its movement in both directions.

An additional object of the present invention is to provide a new and improved cutter embodying novel means for preventing loss of the bit from the chuck when the cutter is in use.

Still another object of the present invention is to provide a new and improved mining machine cutter embodying novel means for mounting the bit in the chuck in such a manner that the bit may be reversed and used at either end.

A further object of the invention is to provide a cutter embodying novel means for mounting a pair of cutter bits, each having cutting edges at both ends, in such a manner that the bits may be reversed in the chuck and used at either end.

Other objects of the present invention are: to provide a cutter which has four effective or cutting edges; to provide a cutter which includes a chuck having a relatively larger head providing a correspondingly large bearing surface for the bits mounted therein; and to provide a cutter which is readily and easily assembled for use.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a fragmentary side elevational view of a mining machine showing a preferred form of the new cutter associated therewith;

Fig. 2 is a sectional view on line 2—2 in Fig. 1;

Fig. 3 is a sectional view on line 3—3 in Fig. 2;

Fig. 4 is a sectional view on line 4—4 in Fig. 3;

Fig. 5 is a perspective view showing a preferred form of chuck for the new cutter;

Fig. 6 is a perspective view similar to Fig. 5, but showing the cutter bits mounted in position of use in the chuck;

Fig. 7 is a top plan view of a modified form of the new cutter;

Fig. 8 is a side elevational view of the cutter shown in Fig. 7;

Fig. 9 is a fragmentary elevational view of the chuck embodied in the form of the invention shown in Figs. 7 and 8;

Fig. 10 is a view similar to Fig. 9 but showing the bit arranged in the chuck; and Fig. 11 is a sectional view on line 11—11 in Fig. 10.

A preferred form of the new cutter is shown in Figs. 1 to 6 inclusive of the drawing, is therein generally indicated at 15, and comprises a two-piece chuck or holder, generally indicated at 16, and which includes a shank portion 17 by means of which the cutter may be mounted in a suitable support which may be, for example, the chain 18 of a mining machine.

The chuck 16 includes a head 19 and formed in this head 19 are two sockets or socket members 20 and 21 and these sockets 20 and 21 are adapted to receive cutter bits 22 and 23, respectively, these sockets 20 and 21 intersecting at one end and diverging at their opposite ends, as may be readily seen from the drawing, thus presenting a V formation. Each of the cutter bits 22 and 23 has two cutting edges or surfaces, that is, the cutter 22 has a cutting face or edge 33 at one end thereof and a cutting face or edge 34 at the other end thereof, and the cutter 23 has a cutting face or edge 35 at one end and a cutting face or edge 36 at the other end thereof.

Formed in the side wall 24 of the socket 20 is a boss or key 25 and this boss or key 25 is adapted to be received in a correspondingly shaped notch or recess 26 which is formed in a side wall 27 of the bit 22. Similarly, the side wall 28 of the socket 21 is provided with a boss or key 29 and this boss or key 29 is adapted to be received in a correspondingly shaped notch or recess 30 which is formed in the bit 23, and in this manner the bits 22 and 23 are held in position in their sockets 20 and 21 in the chuck 16.

Formed in the shank 17 of the chuck 16 is a notch 31 and adapted to engage in this notch 31, when the cutter is in the holder 18, is a key or adjustable element in the form of a set screw 32 (Fig. 3).

In order to insert the cutter bits 22 and 23 into their respective sockets 20 and 21 the two sections of the chuck 16 (Figs. 4 and 7) are separated, and the cutter bits 22 and 23 are laid in the sockets 20 and 21 with the notches 26 and 30 aligned with the bosses or keys 25 and 29, respectively, whereupon the cutter bits 22 and 23 may be forced down into their sockets by tapping upon the upper surfaces of the same.

When the cutter bits 22 and 23 are thus mounted in their sockets 20 and 21, the chuck 16 with the cutter bits 22 and 23 mounted therein may be attached to the chain or support 18 in any suitable manner, such as that shown, by projecting the inner end portion of the set screw 32 into the notch or recess 31.

When the new cutter is thus mounted in position of use upon the supporting chain or carrier 18 the latter may be reciprocated back and forth, by means of the chain 18, and when the chain 18 and the cutter are thus operated the cutting edges 33 and 35 of the bits 22 and 23 will alternately be effective, that is, when the chain or carrier 18 and the cutter 15 carried thereby, are moved in one direction the cutting edge 33 of the bit 22 will be effective, that is, will perform the cutting operation, and when the chain 18 and cutter 15 are moved in the opposite direction the cutting edge 35 of the bit 23 will be effective, that is, will perform the cutting operation. Hence the new cutter may be used in places where it is impossible to move the carrier or supporting chain 18 continuously in one direction but where it is possible to reciprocate the chain or carrier and the cutter carried thereby in opposite directions.

It will be noted that the cutter bits 22 and 23 are readily installed in position of use in the sockets 20 and 21 in the chuck 16, and are likewise readily removed therefrom, these operations being accomplished by simply tapping upon the bits 22 and 23 so as to force the bosses 25 and 29 into, or to remove the same from, the sockets or recesses 26 and 30 respectively, in the chuck 16; and that when the bits are mounted in position of use in the chuck the flat wide head 19 of the chuck provides a relatively large and effective bearing surface for the bits 22 and 23. This arrangement also prevents the cutter bits from becoming lost or displaced from their sockets 20 and 21 when in use. The present arrangement likewise permits the cutter bits 22 and 23 to be removed from their sockets 20 and 21 and reversed so as to use, at different times, both cutting edges of each cutter, and thus prolonging the available life of the cutter and increasing its usefulness. It is also to be noted that no adjustment of the bits 22 and 23 in the chuck, or the latter in the carrier 18, is necessary once the parts are mounted in position of use.

A modified form of the present invention is shown in Figs. 7 to 11 inclusive of the drawing, is therein generally indicated at 37, and comprises a chuck 38 which includes a head 39 and a shank 40, the head 39 being provided with a socket or socket member 41 for the reception of a cutter bit 42.

Formed in the head 39, as an extension of the socket 41, is a notch 44 (Fig. 9) and engageable in this notch 44 is a boss, projection, or key 43 which is formed in the cutter bit 42, the cutter bit 42 having a cutting edge 45 at one end and a cutting edge 46 at its opposite end, thus providing two cutting edges so that the cutter bit may be reversible in use, this form of the invention, shown in Figs. 9 to 11 inclusive, being otherwise similar to the form of the invention shown in Figs. 1 to 6 inclusive.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A cutting tool comprising a chuck including a shank and a head having sockets formed therein in a V-formation, each of said sockets having a notch or recess formed in one marginal edge thereof, and a cutter bit in each of said sockets, each of said cutter bits having a projecting portion or key removably receivable in the corresponding one of said notches for releasably latching said cutter bits in said sockets.

2. A cutting tool comprising a chuck including a shank and a head having sockets formed therein in a substantially V-formation, each of said sockets having a notch formed in one marginal edge thereof, a cutter bit disposed in each of said sockets, each of said cutter bits having a cutting edge at each end thereof, and each of said cutter bits having a projecting portion or key removably receivable in the corresponding one of said notches so that said cutter bits may be removed from the said sockets so as to use, at different times, each of the said cutting edges of the same.

3. A cutting tool comprising a shank and a socket member having a pair of sockets formed therein in a substantially V-formation, a cutter bit member in each of said sockets, each of said cutter bit members having a cutting edge at each end thereof, one of said members having a notch formed therein in a marginal edge thereof and the other of said members having a projecting portion or key removably receivable in the corresponding one of said notches so that said cutter bit members may be removed from the said socket members and the positions thereof reversed so as to use, at different times, each of the said cutting edges of said cutter bit members.

THOMAS M. STEPHENS.